(12) United States Patent
Tesinsky

(10) Patent No.: US 7,243,691 B1
(45) Date of Patent: Jul. 17, 2007

(54) TREE SHEAR

(76) Inventor: Vincent E. Tesinsky, 1423 County Rd. 30, Weston, NE (US) 68070

( * ) Notice: Subject to any disclaimer, the term of this patent is extended or adjusted under 35 U.S.C. 154(b) by 6 days.

(21) Appl. No.: 11/529,448

(22) Filed: Sep. 28, 2006

(51) Int. Cl.
*A01G 23/08* (2006.01)
(52) U.S. Cl. .................. 144/34.5; 144/4.1; 144/3.1
(58) Field of Classification Search ............. 144/34.1, 144/4.1, 34.5, 335, 336, 339, 24.13; 30/134, 30/228, 231, 266, 267, 180, 2.1, 3.1
See application file for complete search history.

(56) References Cited

U.S. PATENT DOCUMENTS

| | | | | |
|---|---|---|---|---|
| 3,640,322 A | * | 2/1972 | Allen | 144/34.5 |
| 3,915,211 A | * | 10/1975 | Barwise | 144/339 |
| 3,999,582 A | * | 12/1976 | Allen et al. | 144/339 |
| 4,050,488 A | * | 9/1977 | Albright | 144/339 |
| 4,147,191 A | * | 4/1979 | Giese | 144/34.5 |
| 4,210,183 A | * | 7/1980 | Nilsen | 144/34.1 |
| 6,453,957 B1 | | 9/2002 | Devaney | 144/34.1 |
| 6,662,836 B1 | * | 12/2003 | Andersen | 144/34.5 |
| 6,901,978 B2 | * | 6/2005 | Simpson | 144/339 |

* cited by examiner

*Primary Examiner*—Bena Miller
(74) *Attorney, Agent, or Firm*—Thomte, Mazour & Nieberall; Dennis L. Thomte

(57) ABSTRACT

A tree shear for use with a prime mover such as a skid-steer loader wherein the tree shear includes a pair of tree shear blades, having forward and rearward ends, which are secured to the forward end of a tree shear frame in a non-movable and fixed manner. The blades define a V-shaped opening therebetween for receiving a tree therebetween. The V-shaped opening decreases in width from the forward end of the blades to the rearward end of the blades. The trees are sheared by moving the prime mover so that the tree is received between the tree shear blades with the continued forward movement of the prime mover causing the tree to be sheared and received within a grapple arm assembly.

4 Claims, 5 Drawing Sheets

TREE SHEAR

BACKGROUND OF THE INVENTION

1. Field of the Invention

This invention relates to a tree shear and more particularly to a tree shear which is adapted to be mounted on the forward end of the boom arms of a skid-steer vehicle or the like. More particularly, the tree shear of this invention utilizes a pair of stationary shear blades which are angularly disposed with one another to define a V-shaped tree receiving notch therebetween.

2. Description of the Related Art

Many tree shears or tree cutting devices have been previously provided and many tree shears or tree cutting devices have been previously provided on the forward ends of the boom arms of a skid-steer loader or the like. In most of the prior art tree shears, one or both of the tree shearing or cutting blades are pivotally mounted at the forward end thereof and are controlled by means of a hydraulic cylinder or cylinders. During the use of the prior art devices, the "open" tree shear is positioned on opposite sides of the tree with one or both of the blades then being pivotally moved to cut or shear the tree positioned therebetween. The fact that the tree shear or cutting blades must be actuated to cut or shear the tree increases the time required to shear the tree. Further, in the tree shearing or cutting apparatuses of the prior art known to applicant, the prior art devices have not provided a convenient means for grappling or grabbing the tree after it has been sheared so that the cut or sheared tree may be moved to a tree pile or the like.

SUMMARY OF THE INVENTION

A tree shear is provided which is used with a prime mover such as a skid-steer loader which includes a pair of boom arms having rearward and forward ends with the rearward ends of the boom arms being pivotally secured to the prime mover. The tree shear apparatus of this invention includes a frame having rearward and forward ends with the rearward end of the tree shear frame being secured to the forward ends of the boom arms for upward and downward movement therewith. The tree shear frame is pivotally secured to the forward ends of the boom arms about a horizontal axis transverse to the boom arms so that the tree shear may be pivoted with respect to the boom arms. A pair of tree shear blades, having forward and rearward ends, are secured to the forward end of the tree shear frame in a non-movable, fixed manner. The tree shear blades define a V-shaped opening therebetween for receiving a tree therebetween. The V-shaped opening decreases in width from the forward end of the blades to the rearward end of the blades.

In operation, the tree shear frame is lowered to a position just above the ground with the prime mover then being moved forwardly so that the tree to be sheared is received within the V-shaped opening. As the prime mover continues to move forwardly, the tree is sheared by the tree shear blades and is contained between a pair of grapple arm assemblies on the tree shear frame. The grapple arm assemblies permit one or more sheared trees to be positioned within the grapple arm assembly. The sheared trees may be moved to a tree pile or the like with the boom arms then being raised and the tree shear pivotally moved with the grapple arms being opened so that the trees may be deposited on the tree pile.

It is therefore a principal object of the invention to provide an improved tree shear apparatus.

A further object of the invention is to provide a tree shear including a frame which is pivotally mounted on the forward end of a prime mover such as a skid-steer loader or the like.

Still another object of the invention is to provide a tree shear which does not include any movable blades, thereby decreasing the amount of time required to shear a tree.

Still another object of the invention is to provide a tree shear of the type described wherein a pair of fixed blades are mounted thereon with the blades being selectively removable for replacement purposes.

Still another object of the invention is to provide a tree shear of the type described including a convenient means for grabbing or grappling the sheared trees so that the same may be moved to a tree pile or the like.

These and other objects will be obvious to those skilled in the art.

BRIEF DESCRIPTION OF THE DRAWINGS

FIG. 3 is a side view of the tree shear of this invention mounted on the forward end of a skid-steer loader or the like;

DETAILED DESCRIPTION OF THE INVENTION

Figure 1:
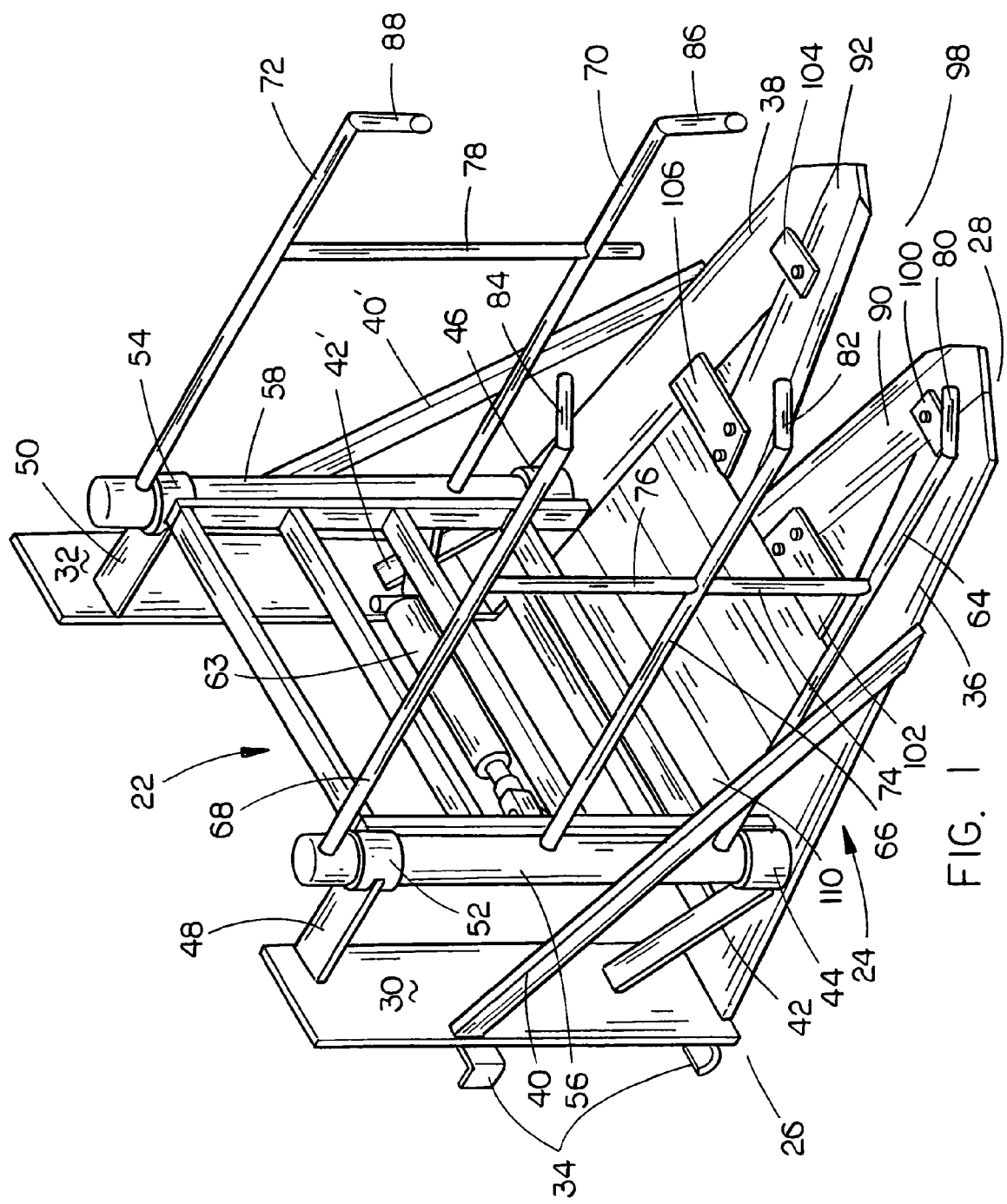
FIG. 1 is a front perspective view of the tree shear of this invention.

The numeral 10 refers to a conventional skid-steer loader or vehicle having a pair of driven wheels 12 at one side thereof and a pair of driven wheels 14 at the other side thereof. Loader 10 includes a pair of boom arms 16 and 18 which are pivoted at their rearward ends to the rear end of the loader and which extend forwardly therefrom. The boom arms 16 and 18 are raised and lowered in conventional fashion such as by hydraulic cylinders 19 in conventional fashion. The numeral 20 refers to a conventional implement mounting apparatus of the quick-attach type which is secured to the forward end of the boom arms 16 and 18 and which is pivotally movable with respect thereto by means of a hydraulic cylinder 21 extending between the boom arms and the apparatus 20.

Figure 2:
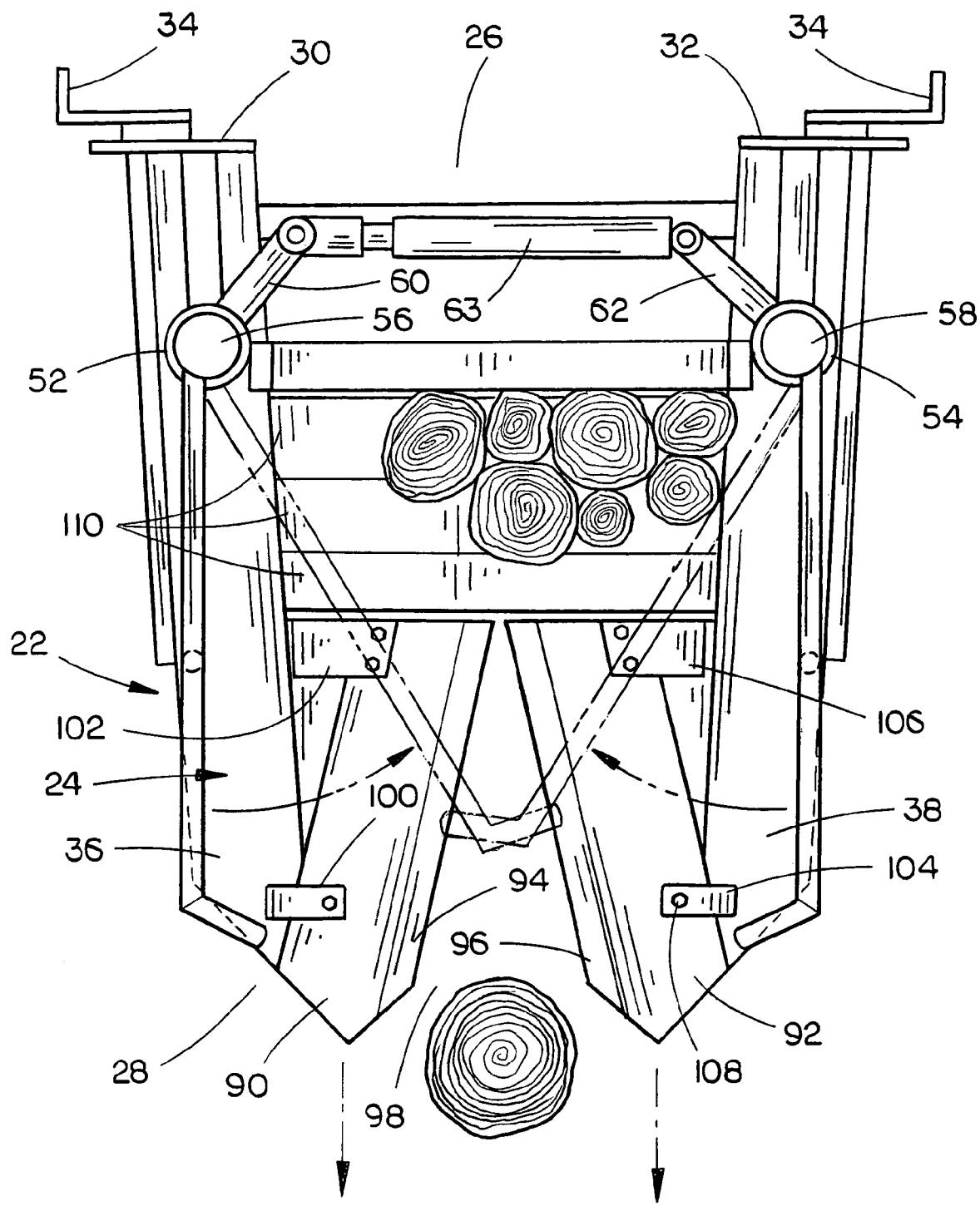
FIG. 2 is a top view of the tree shear of this invention with the broken lines illustrating the manner in which the grapple arm may be closed.

The numeral 22 refers to the tree shear or tree cutting apparatus of this invention which is connected to the implement mounting apparatus 20 as will be explained hereinafter. Tree shear 22 includes a frame means 24 having a rearward end 26 and a forward end 28. Frame 24 includes a pair of upright frame members 30 and 32 which have conventional connectors 34 mounted on the rearward sides thereof for quick attachment to the apparatus 20. Frame 24 also includes a pair of forwardly extending frame members 36 and 38 which are secured to and which extend forwardly from the lower ends of the upright frame members 30 and 32, respectively. Braces 40 and 42 are secured to and extend between upright frame member 30 and frame member 36, while braces 40' and 42' are secured to and extend between upright member 32 and frame member 38, as illustrated in FIG. 1. Collars or sleeves 44 and 46 are positioned on the upper surfaces of frame members 36 and 38, respectively, and are secured thereto by any convenient means such as welding or the like. Supports 48 and 50 are secured to the upper ends of frame members 30 and 32, respectively, and extend forwardly therefrom, as seen in FIG. 1. Collars or sleeves 52 and 54 are welded to the forward ends of supports 48 and 50, respectively. Post 56 has its lower end rotatably received by collar 44 and rotatably extends through collar 52 so that its upper end is exposed thereabove. Similarly, the lower end of post 58 is rotatably received within collar 46 and rotatably extends through collar 54 so that the upper end thereof is exposed thereabove. Arms 60 and 62 are secured to posts 56 and 58, respectively, by welding or the like and extend rearwardly and inwardly therefrom (FIG. 2). A hydraulic cylinder 63 of the double acting type is pivotally secured to and extends between the free ends of the arms 60 and 62, as seen in FIG. 2, to enable the posts 56 and 58 to be rotated about a vertical axis.

Grapple arms 64, 66 and 68 have their rearward ends welded to post 56 while grapple arms 70 and 72 have their rearward ends welded to post 58. Braces 74 and 76 are secured to the grapple arms 64, 66 and 68, respectively. Brace 78 is secured to grapple arms 70 and 72, as seen in FIG. 1. Grapple arm 70 dwells in a plane below the plane of grapple arm 64 while grapple arm 72 is spaced above grapple arm 68 to enable the grapple arms to be moved to the broken line position illustrated in FIG. 2. Grapple arms 64, 66 and 68 have forwardly and inwardly extending tips 80, 82 and 84 provided thereon, respectively, while grapple arms 70 and 72 have inwardly and forwardly extending tips 86 and 88 provided thereon, respectively.

The numerals 90 and 92 refer to shear blades or cutting members having sharpened cutting edges 94 and 96 provided at the inner ends thereof. The blades 90 and 92 are tapered, as seen in FIG. 2. As seen in FIG. 2, the blades 90 and 92 are disposed at an angle with respect to one another to define a generally V-shaped opening 98 formed therein. The blades 90 and 92 are secured to the frame members 36 and 38 by means of plates 100, 102 and 104, 106, respectively. As seen in the drawings, the blades 90 and 92 are secured to the plates 100, 102 and 104, 106 by means of bolts generally referred to by the reference numeral 108 to permit the blades to be replaced as needed. The numeral 110 refers generally to frame members which extend between frame members 36 and 38, respectively, rearwardly of the blades 90 and 92 to provide a support area on the tree shear for supporting sheared trees thereon as will be described in more detail hereinafter.

The method of utilizing or operating the tree shear of this invention will now be described. The tree shear 24 is connected to the quick-attach apparatus 20 on the forward ends of the boom arms 16 and 18 of the skid-steer loader 10. The hydraulic cylinder 63 is fluidly connected to the hydraulic system on the loader 10. When it is desired to shear a tree or trees, the tree shear 22 is lowered to a position near the ground and the tree shear is aligned with the tree to be cut so that the tree will be received within the V-shaped notch 98, as illustrated in FIG. 2. Continued forward movement of the loader 10 with respect to the tree to be cut will cause the cutting edges 94 and 96 of the blades 90 and 92, respectively, to cut into the tree and to sever the tree. The cutting operation is accomplished without the necessity of stopping the vehicle and then pivoting one or more of the cutting blades towards one another to cause the tree to be cut. The grapple arms 80, 82, 84, 86 and 88 will be in the open position illustrated in solid lines in FIG. 2 to enable the branches of the tree and the tree itself to be received therebetween. If the loader is to be moved some distance to another tree, the grapple arms will be moved towards one another by means of the hydraulic cylinder 63, as illustrated by the broken lines FIG. 2. When the operator of the loader desires to cut another tree, the grapple arms are moved from the broken line position of FIG. 2 to the solid line position of FIG. 1 so that additional trees may be placed or received therebetween as additional trees are cut. It can therefore be seen that the stationary blades on the tree shear and the grapple arms enable the cutting of several trees in a "rapid-fire" manner without the necessity of stopping at each tree to operate movable cutting blades.

Figure 3:
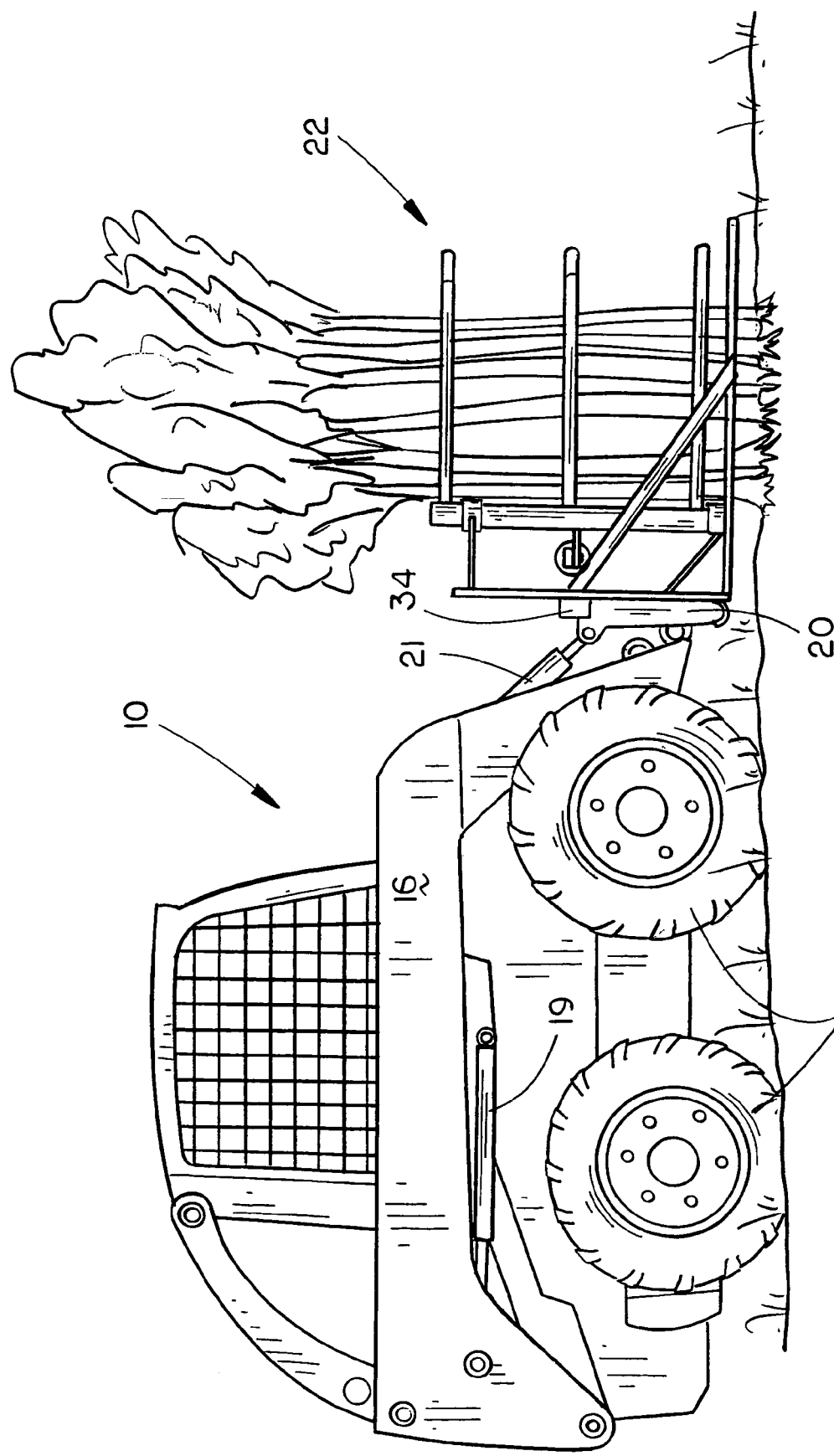
Figure 4:
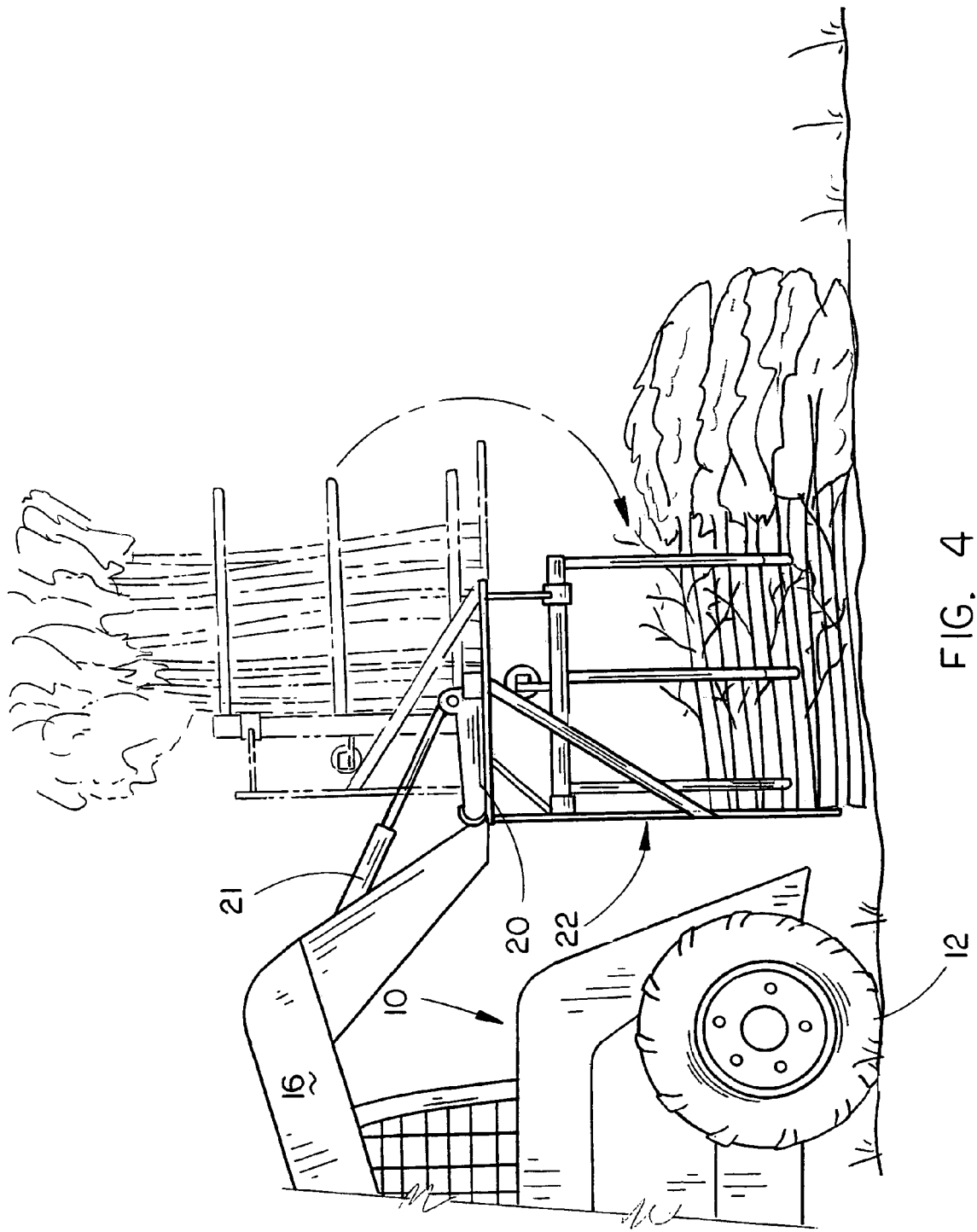
FIG. 4 is a view similar to FIG. 3 except that the tree shear apparatus has been raised from the position of FIG. 3 and pivoted with respect to the loader arms to permit the sheared or cut trees to be dropped from the grapple arm assembly.
Figure 5:
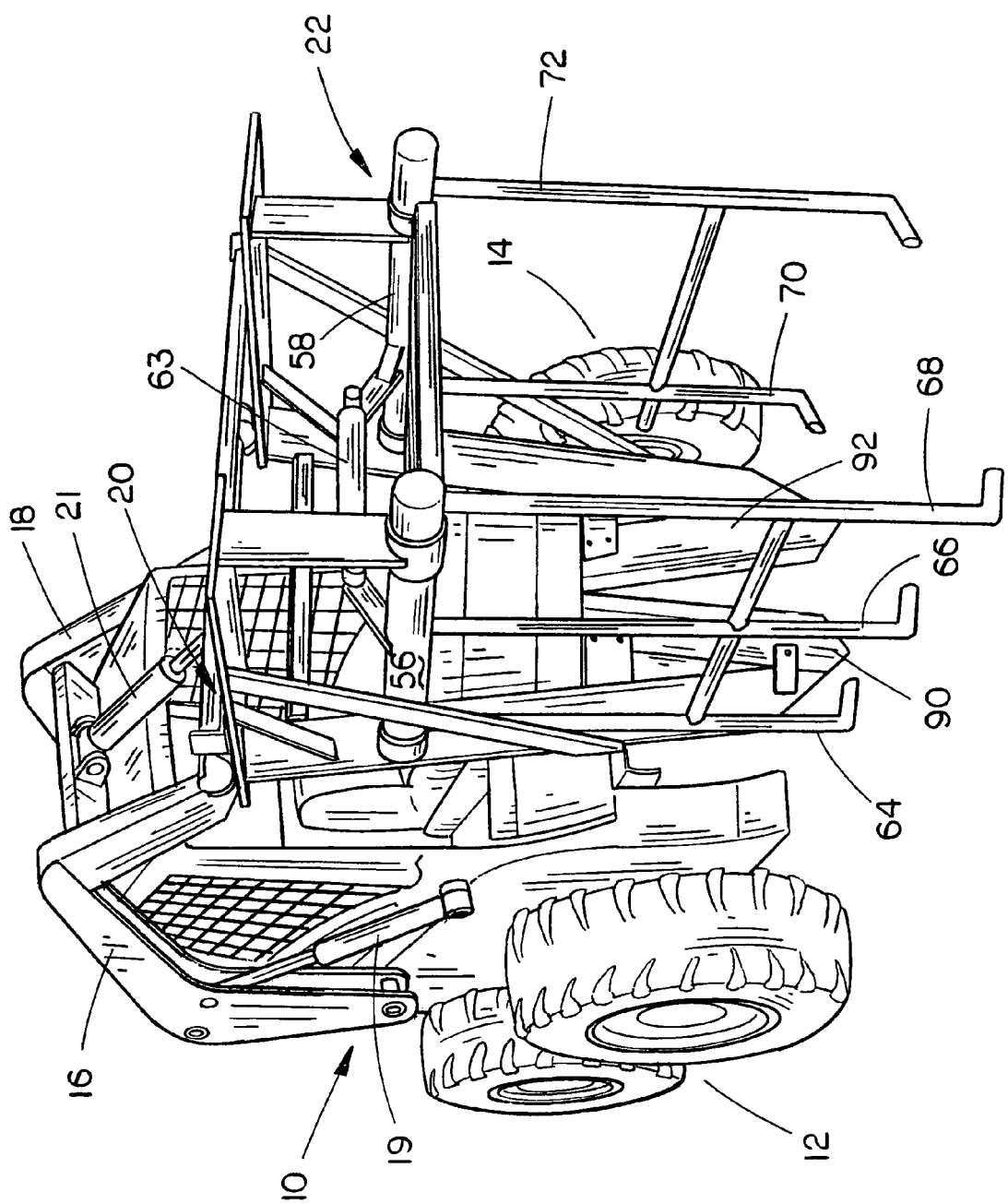
FIG. 5 is a front perspective view of the tree shear in the position illustrated by solid lines in FIG. 4.

When the grapple arm assembly is full of trees, the tree shear is raised to the broken line position of FIG. 4 with the tree shear then being pivoted from the position of FIG. 3 to the dumping position of FIG. 4 at which time the grapple arm assembly will be opened to permit the trees to be deposited on a tree pile or the like. Fig. illustrates the tree shear in its dumping position with the grapple arm assembly in its open position to enable trees to drop therefrom.

Thus it can be seen that the invention accomplishes at least all of its stated objectives.

I claim:

1. In combination with a prime mover including a pair of boom arms having rearward and forward ends with the rearward ends of the boom arms pivotally secured to the prime mover, comprising:
    a tree shear frame having rearward and forward ends;
    said rearward end of said tree shear frame being secured to the forward ends of said boom arms for movement therewith and being pivotally secured to the forward ends of said boom arms about a horizontal axis transverse to the boom arms;
    a pair of tree shear blades, having forward and rearward ends, and an inner shearing surface, secured to the forward end of said tree shear frame in a non-movable fixed manner;
    said inner shearing surface of said blades defining a V-shaped opening therebetween for receiving a tree therebetween;
    said V-shaped opening decreasing in width from the forward end of said blades to the rearward end of said blades whereby the rearward ends of said inner shearing surfaces of said blades are positioned closely adjacent one another.

2. The combination of claim 1 wherein the prime mover is a skid-steer vehicle.

3. The combination of claim 1 wherein said blades are selectively removably mounted on said tree shear frame.

4. The combination of claim 1 further including a grapple arm assembly movably positioned on said tree shear frame above said tree shear blades, said grapple arm assembly being movable from an open position to a closed position to maintain sheared trees therein.

* * * * *